Jan. 3, 1961  R. M. HELLER  2,966,701
APPARATUS FOR MAKING A PROTECTIVE COMPOSITE CAP
STRUCTURE FOR A GREASE FITTING AND THE LIKE
Filed June 2, 1958

INVENTOR.
ROBERT M. HELLER
BY
ATTORNEYS

United States Patent Office 2,966,701
Patented Jan. 3, 1961

2,966,701

APPARATUS FOR MAKING A PROTECTIVE COMPOSITE CAP STRUCTURE FOR A GREASE FITTING AND THE LIKE

Robert M. Heller, Birmingham, Mich., assignor to Watts Electric & Mfg. Co., Birmingham, Mich., a corporation of Michigan Filed June 2, 1958, Ser. No. 739,201

3 Claims. (Cl. 18—34)

This invention relates generally to apparatus for making a protective composite cap structure for a grease fitting and the like.

One of the essential objects of the invention is to provide an apparatus including a tool, preferably in the form of a mandrel having a free end portion of predetermined configuration insertable during two dipping operations, with an interval therebetween, into separate tanks or troughs containing plastic materials in fluid form respectively of low and high hardness and preferably of different colors, whereby the plastic material of low hardness may envelop and form a coating directly upon the free end portion of the mandrel, and the plastic material of high hardness may later envelop and form a coating directly upon a predetermined portion of the initial coating.

Another object is to provide an apparatus including a cooperating tool, preferably in the form of a die to which the mandrel with the two plastic materials aforesaid on the end portion thereof may be moved to cause the lower portions of such superimposed materials hanging or depending from the mandrel as a result of the two dipping operations, to be flattened and shaped within the die to form the base, bead, and finger piece of the cap structure.

Another object is to provide an apparatus wherein a modified form of mandrel is provided with a spring pressed axially extending pin that normally projects outwardly and downwardly from and constitutes a retractable extension of the free end portion of the mandrel to gather thereon more of the plastic materials aforesaid for subsequent spreading during the flattening and shaping operation.

Another object is to provide a mandrel wherein the pin mentioned will be moved upwardly by the die within said free end portion against the tension of the spring during movement of said mandrel relative to said die and is operable when the depending portions of said superimposed coatings on said mandrel are shaped within said die to form registering holes or apertures respectively in the closed end of the socket and in the base on the inner side of and concealed by the finger piece.

Other objects, advantages and novel details of construction of this invention will be made more apparent as this description proceeds, especially when considered in connection with the accompanying drawings wherein.

Figure 1:
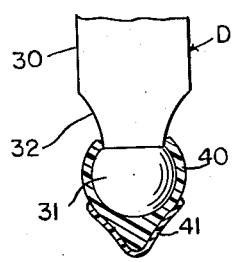
Figure 1 is a fragmentary elevational view of a mandrel embodying my invention, and showing in section two superimposed coatings upon the spherical lower end thereof.
Figure 2:
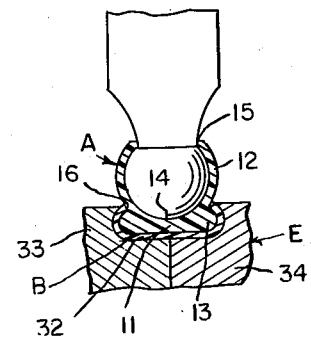
Figure 2 is a fragmentary elevational view of the mandrel, and showing two superimposed shaped coatings upon the spherical lower end thereof within a cavity of a sectional die, the latter being shown in section with parts broken away.

In the drawing, A is the body portion, and B is the knob or finger piece of a cap structure 10 made by my apparatus.

As shown, the body portion A is formed from a relatively soft durable plastic material such as vinyl plastisol of low hardness, and comprises a substantially flat annular base 11 and a hollow substantially globular socket 12 integral with and projecting endwise from one side of said base.

Preferably the base 11 projects laterally beyond the sides of the socket 12 and has at its periphery a circumferentially extending bead 13 of greater thickness than the remainder of the base. Such bead 13 merges with and reinforces the adjacent sides of the globular socket 12.

The socket 12 is closed at one end and open at the other and has relatively thin walls of substantially uniform thickness.

The closed end 14 of the socket is located back to back with the base 11, while the open end 15 of the socket is concentric with the axis of the base 11. Thus this socket 12 of the body portion A is sufficiently soft and flexible to be readily applied to and removed from a grease fitting C and the like.

The knob or finger piece B is formed from a relatively hard durable plastic material such as vinyl plastisol of high hardness, and envelops the base 11 including the peripheral bead 13 thereof. Preferably the inner surface of this knob or finger piece B is united firmly and permanently in surface-to-surface relation to the outer surface of the base 11, including the bead 13 thereof. The edge 16 of said knob or finger piece B extends circumferentially of and abuts or bears against the outer surface of the socket 12. Thus this knob or finger piece B will reinforce and protect the closed end 14 of the socket 12 and will resist compression or distortion. Such knob or finger piece B will also afford a firm grip for the fingers when the cap structure 10 is applied to and removed from a grease fitting C and the like.

In addition to forming the cap structure from two plastic materials of different hardness, such plastic materials are also of different colors to provide a two tone effect. Preferably the body portion A is formed from a red plastic material, while the knob or finger piece B is formed from a dark blue plastic material.

In use, the socket 12 is sleeved upon the globular free end portion 20 of the grease fitting C, so that the closed end 14 of the socket, the base 11, and the knob or finger piece B will be disposed over and will effectively prevent any foreign matter such as dust, dirt, grit and moisture from entering the grease passage in said fitting C. Preferably the inside dimensions of the socket 12 of the cap structure are approximately the same as the outside dimensions of the globular free end portion 20 of the fitting C, so that the relatively soft flexible walls of the socket 12 will envelop and will fit tightly upon the globular free end portion 20 of the fitting. The knob or finger piece B of the cap structure may be utilized to apply the socket 12 of the cap structure to and to remove such socket from the fitting C.

The apparatus embodying my invention for making the aforesaid cap structure comprises a mandrel D, and a die E.

As shown, the mandrel D has a cylindrical body portion 30, a reduced substantially spherical free end portion 31, and a shank portion 32 tapering from the body portion 30 to the spherical end portion 31.

The die E has a sectional body portion provided with a cavity 32 of predetermined configuration in which the base 11, bead 13 and finger piece B of the cap structure are formed. Preferably the sections 33 and 34 of the die E are movable horizontally toward and from each other by suitable means (not shown) to enable the formed base 11, bead 13 and finger piece B to be withdrawn therefrom.

In the present instance, the mandrel may be suspended in vertical position from a horizontally movable endless conveyor (not shown) which, at predetermined points of its orbit, is depressed by suitable cams (not shown), to cause the spherical free end portion 31 of the mandrel to dip into plastic materials respectively of low and high hardness contained in liquid form within separate tanks or troughs (not shown), with an interval between such dipping operations, whereby said spherical free end portion 31 will first be coated by plastic material 40 of low hardness and preferably of a predetermined color such as red to form the socket 12 of the cap structure, and the lower portion of the initial coating of low hardness will subsequently be coated by plastic material 41 of high hardness of another predetermined color such as blue.

At other predetermined points of the orbit of the endless conveyor, the conveyor is depressed by cams (not shown) to cause the lower portions of the superimposed coatings of low and high hardness depending from the free lower end of the mandrel as a result of the two dipping operations, to be flattened and shaped within and against the walls of the cavity 32 of the mold E to form the base 11, bead 13 and finger piece B of the cap structure. Any suitable means for moving the endless conveyor to advance the mandrel as desired from one station to another may be employed.

Preferably the mandrel D is preheated by means (not shown) before it reaches the first dipping station, i.e. where the spherical free end portion 31 of the mandrel is dipped into the plastic material of low hardness to form the socket portion 12 of the cap structure, and is heated again to partially fuse the plastic material of low hardness thereon by means (not shown) before the mandrel reaches the second dipping station, i.e. where the free end portion 31 of the mandrel with the partially fused initial coatings thereon are dipped into the plastic material of high hardness.

Before reaching the die E the superimposed plastic coatings on the free end of the mandrel are then heated again to cause the plastic coating of high hardness to be fused to the initial plastic coating of low hardness. The mandrel and the two superimposed coatings are still hot when they reach the die.

After the depending lower end portions of the superimposed fused coatings 40 and 41 have been flattened and shaped in the die E to form the base 11, bead 13 and finger piece B of the cap structure, the mandrel D and the two shaped coatings 40 and 41 thereon are partially cooled so that said coatings will set and maintain their shape. If desired, such partially cooled mandrel and set plastic coatings thereon may be cooled further. Then the cooled shaped coatings are stripped from the free end portion 31 of the mandrel D to provide the finished cap structure 10.

Figure 4:
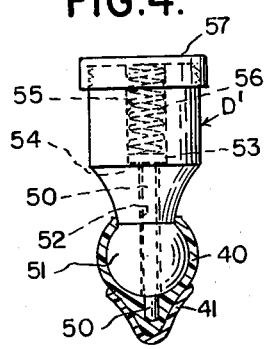
Figure 4 is an elevational view of a slightly modified form of mandrel, and showing in section two superimposed coatings upon the spherical lower end thereof.
Figure 5:
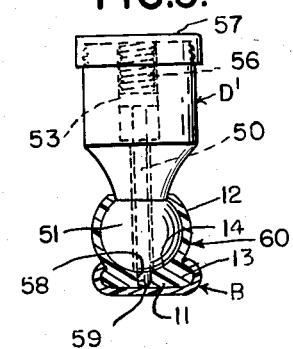
Figure 5 is a view similar to Figure 4, but showing the plastic coatings after they have been shaped in the die, and showing the spring pressed pin in its raised position.
Figure 3:
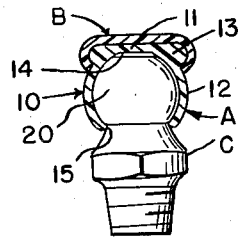
Figure 3 is an elevational view of a grease fitting, and showing in section a cap structure made by my apparatus applied to said fitting.

In Figures 4 and 5, I have illustrated a slight modification wherein the mandrel D' is provided with a spring pressed axially extending pin 50 that normally projects outwardly and downwardly from and constitutes a retractable extension of the spherical end portion 51 of the mandrel to gather thereon more of the plastic materials aforesaid for subsequent spreading during the flattening and shaping operation in the die E.

As shown, the pin 50 is slidable within an axially extending bore 52 in the mandrel and has at its upper end a substantially flat head 53 normally engaging the base or lower end 54 of a larger axially extending bore 55 in the mandrel. A coil spring 56 is located within the larger bore 55 between the head 53 of the pin and a flanged cap 57 that threadedly engages the mandrel. Such spring 56 urges the pin 50 downwardly and outwardly.

In use, the pin 50 will be moved upwardly by the die E within the spherical end portion 51 of the mandrel D' against the tension of the spring 56 during movement of said mandrel D' relative to said die E, and is operable when the depending portions of said superimposed coatings 40 and 41 on said mandrel are shaped within said die to form registering holes or apertures 58 and 59 respectively in the closed end 14 of the socket 12 and in the base 11 on the inner side of and concealed by the knob or finger piece B of the cap structure 60.

What I claim as my invention is:

1. Apparatus for use during dipping operations in liquid plastic for making a protective composite plastic cap structure having a hollow socket open at one end, a base at the closed end of said socket, and a finger piece enveloping the outer side of said base; comprising a mandrel and a die movable relative to each other, said mandrel having a substantially spherical free end portion adapted to be dipped successively into plastic materials in liquid form respectively of relatively low and high hardness to provide superimposed coatings of said materials thereon, said mandrel being provided with an elongated axially extending pin normally projecting outwardly and downwardly from and constituting a retractable extension of said spherical end portion to gather thereon more of said plastic materials during the dipping operations, a spring in said mandrel urging said pin to its normal projected position, said die having a body portion provided with a cavity of predetermined configuration in which depending portions of the two superimposed coatings on the free end of said mandrel are adapted to be shaped during movement of the mandrel relative to said die to form the base and finger piece of said cap structure, said pin being movable upwardly by said die within said spherical end portion against the tension of said spring during movement of said mandrel relative to said die and operable when the depending portions of said superimposed coatings on said mandrel are shaped within said die to form registering apertures respectively in the closed end of said socket and in said base on the inner side of and concealed by said finger piece.

2. Apparatus for use during dipping operations in liquid plastic for making a composite plastic cap structure having a hollow body portion open at one end to provide a socket and having a finger piece enveloping the closed end of said body portion; comprising a movable mandrel and a die movable relative to each other, said mandrel having a free end portion adapted to be dipped into plastic materials in liquid form respectively of relatively low and high hardness to provide superimposed coatings of said materials thereon, said mandrel being provided with an elongated axially extending pin normally projecting outwardly and downwardly from and constituting a retractable extension of said free end portion to gather thereon more of said plastic materials during the dipping operations, a spring in said mandrel urging said pin to its normal projected position, said die having a body portion provided with a cavity of predetermined configuration in which depending portions of the two superimposed coatings on the free end of said mandrel are adapted to be shaped during movement of the mandrel relative to said die to form the finger piece and the closed end of the body portion of said cap structure, said pin being movable upwardly by said die within said free end portion against the tension of said spring during movement of said mandrel relative to said die and operable when the depending portions of said superimposed coatings on said mandrel are shaped within said die to form an aperture in the closed end of said body portion on the inner side of and concealed by said finger piece.

3. Apparatus for use during dipping operations in liquid plastic for making a composite plastic article, said apparatus comprising a mandrel and a die movable relative to each other, said mandrel having a free end portion adapted to be dipped into liquid plastic materials in liquid form respectively of relatively low and high hardness to provide superimposed coatings of said materials thereon, said mandrel being provided with an elongated, axially extending pin normally projecting outwardly and downwardly from and constituting a retractable extension of said free end portion to gather thereon more of said plastic materials during the dipping operations, a spring in said mandrel urging said pin to its normal projected position, said die having a body portion provided with a cavity of predetermined configuration in which depending portions of the two superimposed coatings on the free end of said mandrel are adapted to be shaped during movement of the mandrel relative to said die, said pin being movable upwardly by said die within said free end portion against the tension of said spring during movement of said mandrel relative to said die and operable when the depending portions of said superimposed coatings on said mandrel are shaped within said die to form an aperture in said depending portion of one of the coatings.

References Cited in the file of this patent

UNITED STATES PATENTS

| | | |
|---|---|---|
| 1,527,659 | Wilkie | Feb. 24, 1925 |
| 2,090,528 | Ferngren | Aug. 17, 1937 |
| 2,308,724 | Stamberger | Jan. 19, 1943 |
| 2,410,936 | Gronemeyer et al. | Nov. 12, 1946 |
| 2,478,771 | Mafko | Aug. 9, 1949 |
| 2,525,272 | Rhoton | Oct. 10, 1950 |
| 2,617,208 | Marx et al. | Nov. 11, 1952 |
| 2,636,215 | Smith | Apr. 28, 1953 |
| 2,730,765 | Crafton et al. | Jan. 17, 1956 |
| 2,834,052 | Hunn | May 13, 1958 |
| 2,840,858 | Rainer et al. | July 1, 1958 |

FOREIGN PATENTS

| | | |
|---|---|---|
| 550,719 | Great Britain | Jan. 21, 1943 |

OTHER REFERENCES

Baird: "P.V.C. Paste," from British Plastics, Apr. 1948, pages 167–171.